US006953632B2

United States Patent
Hayashi et al.

(10) Patent No.: US 6,953,632 B2
(45) Date of Patent: Oct. 11, 2005

(54) FUEL CELL STACK AND A METHOD OF OPERATING THE SAME

(75) Inventors: Katsumi Hayashi, Utsunomiya (JP); Hideo Kato, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 4 days.

(21) Appl. No.: 10/208,895

(22) Filed: Jul. 30, 2002

(65) Prior Publication Data

US 2003/0022046 A1 Jan. 30, 2003

(30) Foreign Application Priority Data

Jul. 30, 2001 (JP) ........................................ 2001-229848

(51) Int. Cl.[7] .............................................. H01M 8/04
(52) U.S. Cl. ............................. 429/26; 429/24; 429/34
(58) Field of Search .............................. 429/26, 23, 24, 429/34, 120

(56) References Cited

U.S. PATENT DOCUMENTS 6,210,823 B1 * 4/2001 Hatoh et al. .................. 429/30
6,489,048 B1 * 12/2002 Ernst et al. ................... 429/13
2001/0036568 A1 * 11/2001 Farkash et al. .............. 429/26
2003/0091884 A1 * 5/2003 Scartozzi ..................... 429/32

FOREIGN PATENT DOCUMENTS

| JP | 60-172175 | * | 9/1985 | ............ H01M/8/04 |
| JP | 08130028 A | | 5/1996 | |
| JP | 08167424 A | | 6/1996 | |

* cited by examiner

Primary Examiner—Raymond Alejandro
(74) Attorney, Agent, or Firm—Lahive & Cockfield, LLP; Anthony A. Laurentano, Esq.

(57) ABSTRACT

A plurality of fuel cells are stacked together. Current collectors are stacked on the fuel cells at opposite ends in a stacking direction of said fuel cells, and heating members are stacked on the outside of said current collectors. In a normal operating condition, electricity is delivered through the current collectors. When the temperature of end cells is lowered, a switching operation is performed to stop delivering electricity through the current collectors and start delivering electricity through the heating members.

5 Claims, 8 Drawing Sheets

FUEL CELL STACK AND A METHOD OF OPERATING THE SAME

BACKGROUND OF THE INVENTION

1. Field of the Invention

The present invention relates to a fuel cell stack and a method of operating the fuel cell stack. The fuel cell stack comprises a plurality of fuel cells stacked together. Each of the fuel cells includes a pair of separators and an electrolyte electrode assembly interposed between the separators. The fuel cell stack further comprises an anode current collector and a cathode current collector stacked on outermost fuel cells at opposite ends in a stacking direction of the fuel cells.

2. Description of the Related Art

In recent years, various types of fuel cells such as a polymer electrolyte fuel cell (PEFC) have been developed. The polymer electrolyte fuel cell employs a membrane electrode assembly (MEA) which comprises two electrodes (anode and cathode) and an electrolyte membrane interposed between the electrodes. The electrolyte membrane is a polymer ion exchange membrane (proton exchange membrane). Each of the electrodes comprises a catalyst and a porous carbon. The membrane electrode assembly is interposed between separators (bipolar plates). The membrane electrode assembly and the separators make up a unit of the fuel cell for generating electricity. A plurality of fuel cells are connected together to form a fuel cell stack.

In the fuel cell, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte, and the electrons flow through an external circuit to the cathode, creating a DC electric current. An oxygen-containing gas or air is supplied to the cathode. At the cathode, the hydrogen ions from the anode combine with the electrons and oxygen to form water.

In the fuel cell stack, temperature of some of the fuel cells tends to be low in comparison with the other fuel cells. Specifically, one end surface of each of the outermost fuel cells (end cells) in the stacking direction is exposed to the external air, and thus, the end cells are likely to be cooled by the external air. If the temperature of the end cells is lowered significantly, the power generating performance of the end cells is lowered. Further, dew condensation may occur in the end cells. Water produced in the chemical reaction is not smoothly discharged from the end cells, and the voltage of the end cells are lowered.

In particular, when the fuel cell stack is operated at a temperature below the freezing point, the difference between the temperature in the fuel cell stack and the external air temperature is large. Therefore, the temperature in each of the end cells is lowered significantly. If the operation the fuel cell stack is started at the temperature below the freezing point, water produced at the time of power generation in each of the end cells is cooled down below the freezing point. The frozen water may close reaction gas flow passages (oxygen-containing gas flow passage and/or fuel gas flow passage) or the porous carbon undesirably. As a result, a shortage of reaction gases may occur in the end cells. The shortage of the reaction gases gives rise to a voltage drop in the end cells.

In an attempt to prevent the end cells from being cooled excessively, for example, Japanese laid-open patent publication No. 8-130028 (the prior art 1) discloses a solid polymer electrolyte fuel cell stack which does not have any grooves (coolant passages) in outer separators of end cells for preventing the separators from being cooled excessively.

Further, Japanese laid-open patent publication No. 8-167424 (prior art 2) discloses a solid polymer electrolyte fuel cell stack which includes heating members heated by an electric current flowing from the solid polymer electrolyte fuel cell stack. The heating member is disposed at least on each of current collectors in contact with the outer surfaces of outermost separators of the fuel cell stack for preventing end cells from being cooled excessively.

In the prior art 1, the solid polymer electrolyte fuel cell stack requires different types of separators, i.e., the separator which has the groove as the coolant passage, and the separator which does not have the groove. The requirement for the different types of separators is a burden in the production line, and thus, the production cost is high.

In the prior art 2, the heating member is disposed between the current collector for collecting electricity and the fuel cell. The heating member constantly consumes electricity generated by the solid polymer electrolyte fuel cell stack. Even if the heating of the end cells is not necessary in the operation of the solid polymer electrolyte fuel cell stack, the heating member consumes electricity wastefully. Therefore, the power generation efficiency of the overall fuel cell stack is lowered.

SUMMARY OF THE INVENTION

An general object of the present invention is to provide a fuel cell stack and a method of operating the fuel cell stack in which the temperature drop of the fuel cells is effectively prevented with a simple structure and a simple operating process for improving the power generating performance of the respective fuel cells, and the power generation is performed efficiently.

In the present invention, a fuel cell stack comprises a plurality of fuel cells stacked together, the fuel cells each including a pair of separators, and an electrolyte electrode assembly interposed between the separators, the electrolyte electrode assembly including an anode, a cathode, and an electrolyte interposed between the anode and the cathode, the fuel cell stack further comprising:

current collectors stacked on outermost fuel cells at opposite ends in a stacking direction of the fuel cells; and a heating member stacked on the outside of at least one of the current collectors, the heating member having a power outputting terminal for conducting electricity from the fuel cell stack.

If the operation of the fuel cell stack is started in an atmosphere at a relatively low temperature, electricity is delivered through the power outputting terminal of the heating member. When the temperature of the fuel cells is increased until the fuel cell stack starts operation in the normal operating condition, a switching operation is performed to stop delivering electricity through the power outputting terminal of the heating member, and start delivering electricity through the power outputting terminal of the current collector.

Therefore, it is possible to prevent the heat radiation from the end cells to the outside, and effectively prevent the temperature drop of the end cells. The power generating performance of end cells is not lowered, and no dew condensation occurs in the end cells. Thus, it is possible to maintain a desirable power generating performance. When the fuel cell stack is in the normal operating condition and heating of the heating members is not necessary, electricity is not supplied to the heating members. Therefore, electricity is not wastefully consumed and the power generation in the fuel cell stack is performed efficiently.

In particular, when the operation of the fuel cell stack is started in an atmosphere at a temperature below the freezing point, the end cells are heated by the heating members. Therefore, the end cells are not cooled down below the freezing point. Water produced at the time of power generation in each of the end cells is not frozen. Thus, the reaction gas passage is not closed by the frozen water, and the shortage of the reaction gases does not occur. It is possible to prevent the voltage drop in the end cells.

Further, in the present invention, it is determined whether the fuel cell stack is in a normal operating condition. If it is determined that the fuel cell stack is not in the normal operating condition, electricity from the fuel cell stack is delivered through the outputting terminal of the heating member. If it is determined that the fuel cell stack is in the normal operating condition, a switching operation is performed to stop delivering electricity from the fuel cell stack through the power outputting terminal of the heating member and start delivering electricity from the fuel cell stack through the current collector.

For example, when the load is lightened during the operation of the fuel cell stack, the amount of heat radiation from the end cells is large in comparison with the heat generation of the fuel stack cell, and thus, the temperature of the end cells is lowered. By performing the switching operation, electricity is delivered through the heating member to raise the temperature of the heating member. Therefore, the heat radiation from the end cells is prevented, and the voltage drop due to the large heat radiation is prevented. It is possible to effectively maintain the desirable power generation performance.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
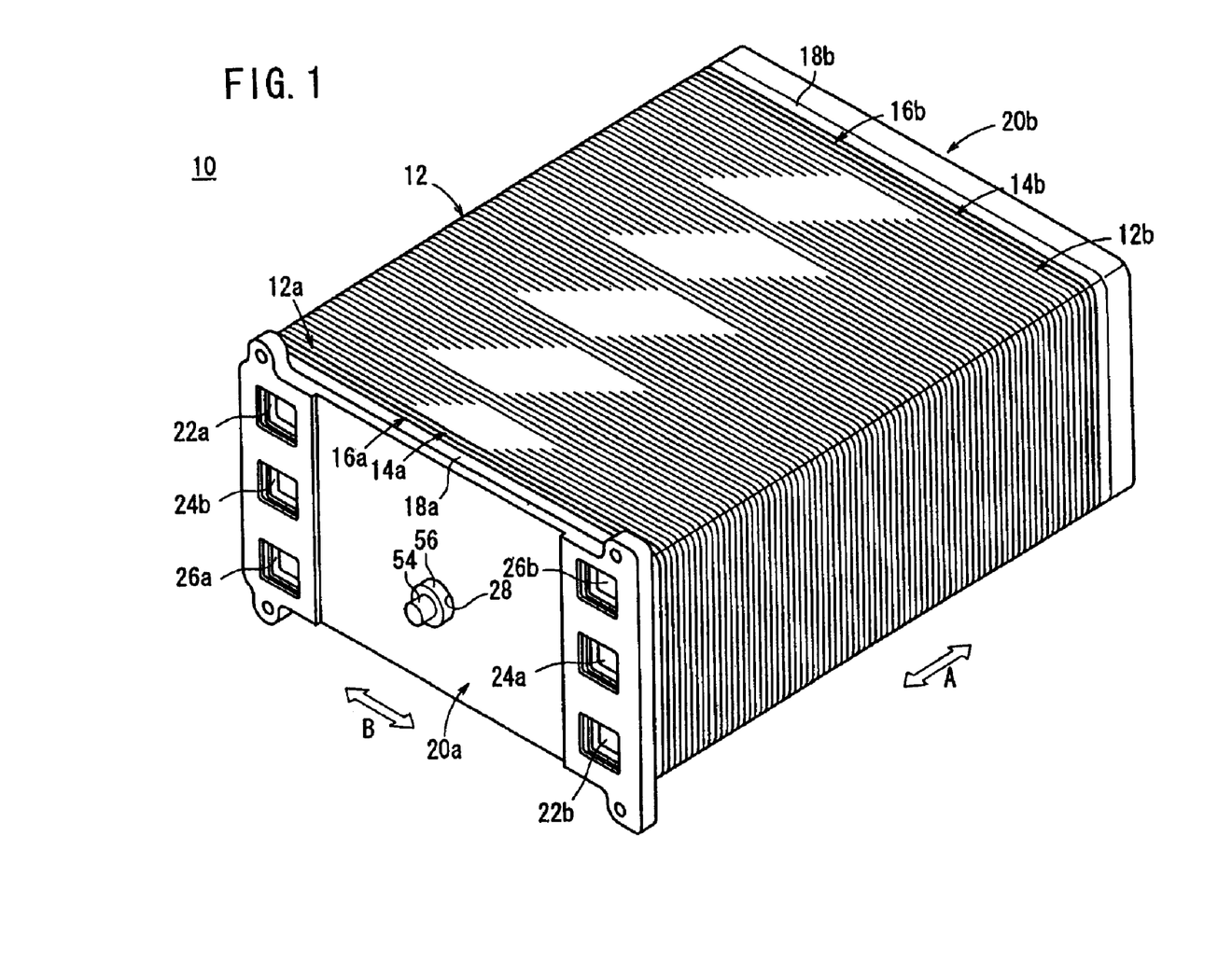
FIG. 1 is a schematic perspective view showing a fuel cell stack according to a first embodiment of the present invention.
Figure 2:
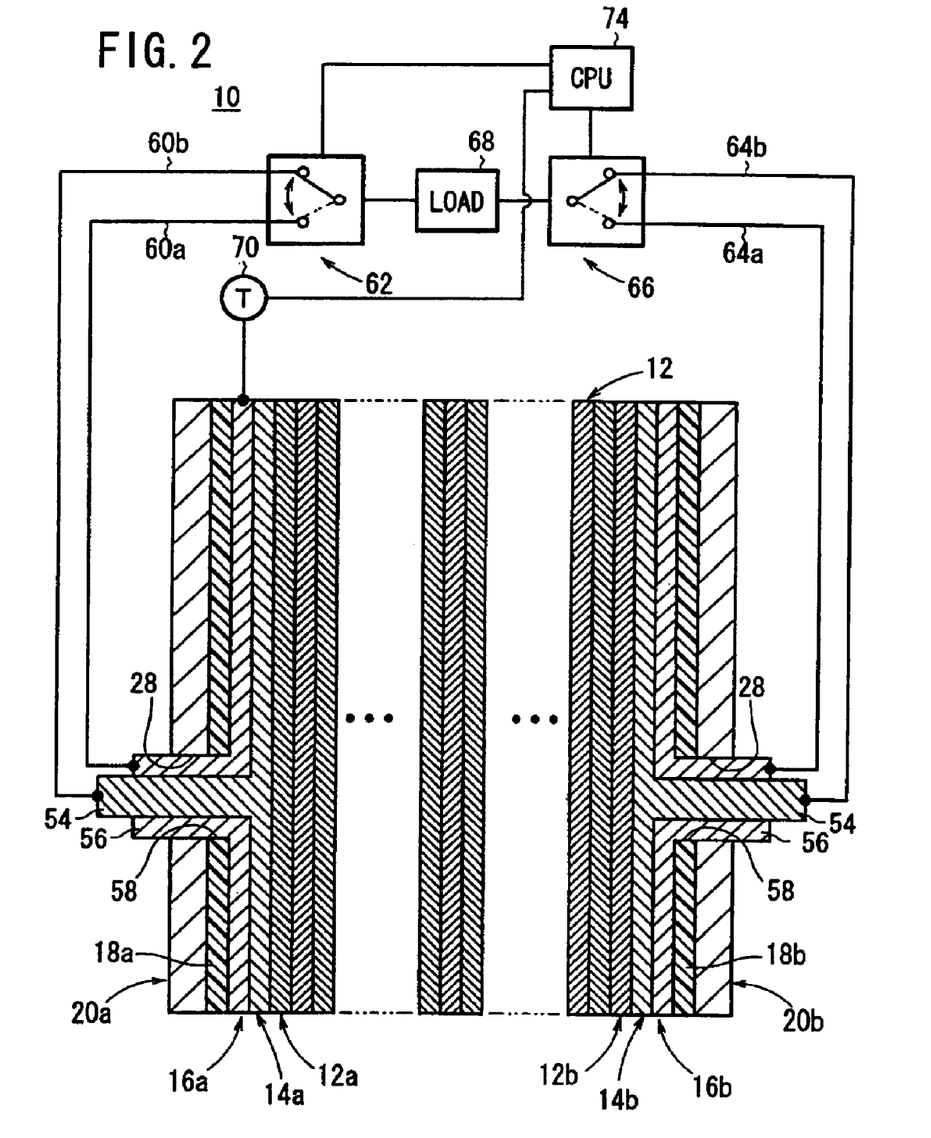
FIG. 2 is a diagram showing a circuit for delivering electricity from the fuel cell stack according to the first embodiment of the present invention.
Figure 3:
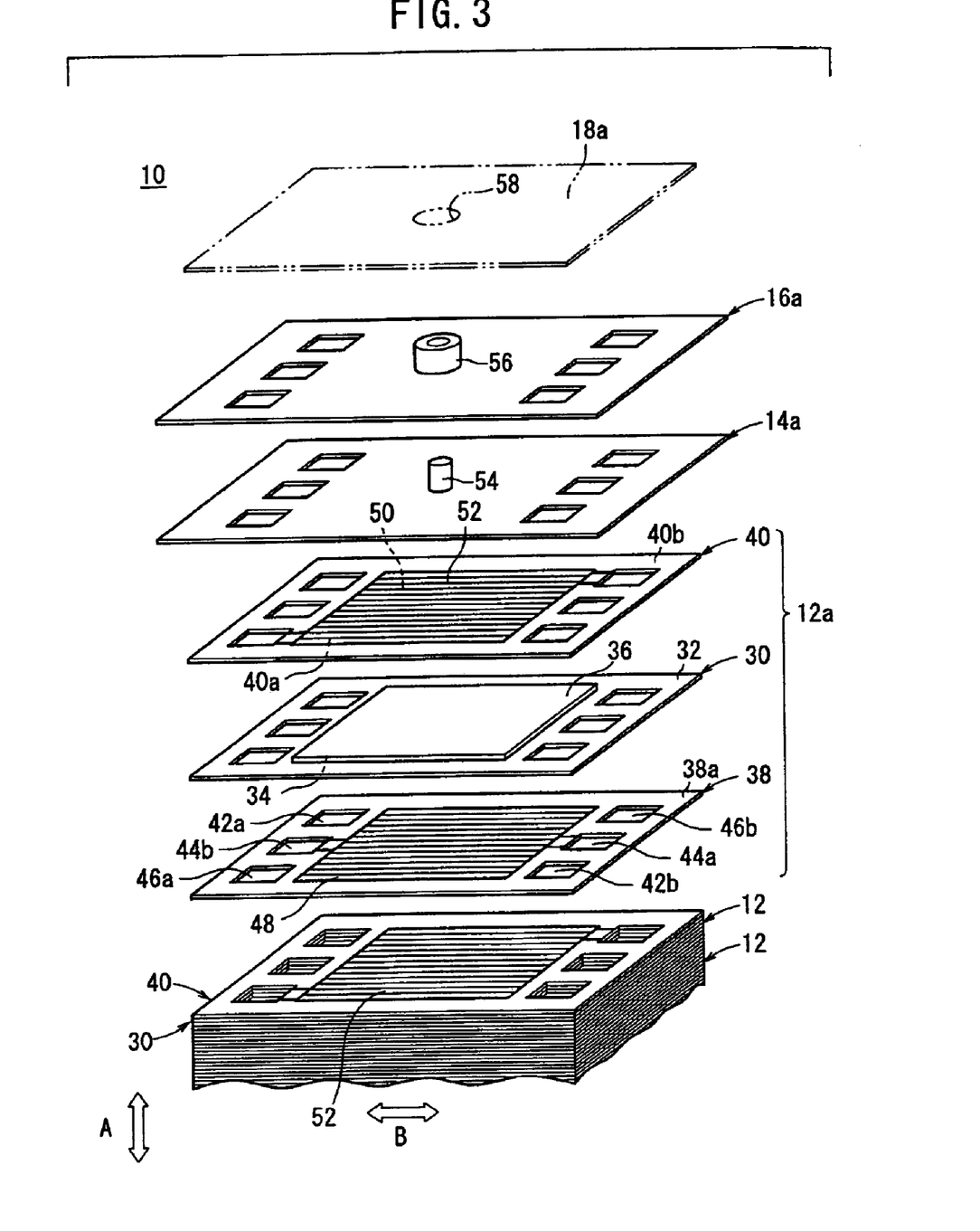
FIG. 3 is an exploded perspective showing main components of the fuel cell stack.

FIG. 1 is a schematic perspective view showing a fuel cell stack 10 according to a first embodiment of the present invention, and FIG. 2 is a view showing a circuit for delivering electricity from the fuel cell stack 10. FIG. 3 is an exploded perspective view showing main components of the fuel cell stack 10.

The fuel cell stack 10 includes a plurality of fuel cells 12 stacked in a direction indicated by an arrow A. End cells (outermost fuel cells) 12a, 12b are disposed at opposite ends in the stacking direction of the fuel cells 12. A cathode current collector 14a and an anode current collector 14b are stacked on the end cells 12a, 12b. Heating members 16a, 16b are stacked on the outside of the cathode current collector 14a and the anode current collector 14b, respectively. Insulating plates 18a, 18b are stacked on the outside of the heating members 16a, 16b, respectively. Further, end plates 20a, 20b are stacked on the outside of the insulating plates 18a, 18b, respectively. The fuel cells 12 are fastened together by tightening the end plates 20a, 20b with an unillustrated tie rod or the like.

As shown in FIG. 1, at one longitudinal end of the end plate 20a in the direction indicated by an arrow B, an oxygen-containing gas supply port 22a, a fuel gas discharge port 24b, and a coolant supply port 26a are arranged vertically. At the other longitudinal end of the end plate 20a, a coolant discharge port 26b, a fuel gas supply port 24a, and an oxygen-containing gas discharge port 22b are arranged vertically. Further, a hole 28 for receiving a power outputting terminal 56 is formed at a substantially central portion in the end plate 20a.

The fuel cells 12 including the end cells 12a, 12b have the same structure. As shown in FIG. 3, the end cell 12a includes a membrane electrode assembly 30. The membrane electrode assembly 30 comprises an anode 34, and a cathode 36, and a solid polymer ion exchange membrane 32 interposed between the anode 34 and the cathode 36. Each of the anode 34 and the cathode 36 comprises a sheet of porous carbon paper acting as a gas diffusion layer, and a noble metal based catalyst coated on the gas diffusion layer. The membrane electrode assembly 30 is interposed between conductive separators, a first separator 38, and a second separator 40. The membrane electrode assembly 30 and the first separator 38, and the second separator 40 jointly make up the end cell 12a. At one longitudinal end of the end cell 12a in the direction indicated by an arrow B, an oxygen-containing gas supply passage 42a, a fuel gas discharge passage 44b, and a coolant supply passage 46a are arranged. At the other longitudinal end of the end cell 12a, a coolant discharge passage 46b, a fuel gas supply passage 44a, and an oxygen-containing gas discharge passage 42b are arranged.

The first separator 38 has a fuel gas flow passage 48 comprising a plurality of grooves on its surface 38a facing to the anode 34. The fuel gas flow passage 48 is connected to the fuel gas supply passage 44a at one side and connected to the fuel gas discharge passage 44b at the other side.

As with the first separator 38, the second separator 40 has an oxygen-containing gas flow passage 50 comprising a plurality of grooves on its surface 40a facing to the cathode 36. The oxygen-containing gas flow passage 50 is connected to the oxygen-containing gas supply passage 42a at one side and connected to the oxygen-containing gas discharge passage 42b at the other side. A coolant flow passage 52 connected to the coolant supply passage 46a and the coolant discharge passage 46b is formed in a surface 40b of the second separator 40.

The current collector 14a is an electric conductive terminal formed of a material having high conductivity such as gold-plated copper. A power outputting terminal 54 is formed at a substantially central portion in the current collector 14a. The power outputting terminal 54 protrudes in a direction perpendicular to the surface of the current collector 14a, i.e., in a direction indicated by the arrow A. The heating member 16a is an electric conductive terminal formed of a material having low conductivity such as alloy used in electric heating. A cylindrical power outputting terminal 56 for receiving the power outputting terminal 54 is disposed at a substantially central portion in the heating member 16a. The cylindrical power outputting terminal 56 protrudes in a direction perpendicular to the surface of the heating member 16a.

A hole 58 is formed at a substantially central portion in the insulating plate 18a. The power outputting terminal 56 of the heating member 16a is inserted into the hole 58 of the insulating plate 18a, and the hole 28 of the end plate 20a such that a distal end of the power outputting terminal 56 protrudes from the hole 28 by a predetermined length. The power outputting terminal 54 of the current collector 14a is inserted into the power outputting terminal 56, and protrudes from the surface of the power outputting terminal 56 by a predetermined length (see FIG. 1).

The current collector 14a and the current collector 14b have the same structure, and the heating member 16a and the heating member 16b have the same structure, respectively. Therefore, the constituent elements of the current collector 14b and the heating member 16b that are identical to those of the current collector 14a and the heating member 16b are labeled with the same reference numeral, and description thereof is omitted.

As shown in FIG. 2, the power outputting terminal 54 of the current collector 14a and the power outputting terminal 56 of the heating member 16a are connected to a first switch 62 through a lead wires 60a, 60b. The power outputting terminal 54 of the current collector 14b and the power outputting terminal 56 of the heating member 16b are connected to a second switch 66 through lead wires 64a, 64b.

A load 68 such as a motor is connected between the first switch 62 and the second switch 66. A temperature sensor 70 is connected to the heating member 16a. The temperature sensor 70 detects the temperature of the heating member 16a, and outputs a detection signal to a CPU (control unit) 74. The CPU 74 controls the switching operation of the first switch 62 and the second switch 66.

Next, an operation of the fuel cell stack 10 will be described.

In the fuel cell stack 10 shown in FIG. 1, a fuel gas such as a hydrogen-containing gas is supplied to the fuel gas supply port 24a, an oxygen-containing gas such as air is supplied to the oxygen-containing gas supply port 22a, a coolant such as a pure water, an ethylene glycol or an oil is supplied to the coolant supply port 26. From the fuel gas supply port 24a, the oxygen-containing gas supply port 22a, and the coolant supply port 26a, the fuel gas, the oxygen-containing gas, and the coolant are supplied to each of the fuel cells 12 including the end cells 12a, 12b which are stacked together in the direction indicated by the arrow A to form the fuel cell stack 10.

As shown in FIG. 3, the oxygen-containing gas supplied to the oxygen-containing gas supply port 22a flows through the oxygen-containing gas supply passage 42a in the direction indicated by the arrow A. The oxygen-containing gas is introduced into the oxygen-containing gas flow passage 50 formed on the surface 40a of the second separator 40. The oxygen-containing gas in the oxygen-containing gas flow passage 50 flows along the cathode 36 to induce a chemical reaction at the cathode 36. The unreacted oxygen-containing gas is discharged from the fuel cell stack 10 through the oxygen-containing gas discharge passage 42b.

The fuel gas supplied to the fuel gas supply port 24a is introduced into the fuel gas supply passage 44a extending in the direction indicated by the arrow A. Then, the fuel gas is introduced into the fuel gas flow passage 48 formed on the surface 38a of the first separator 38. The fuel gas in the fuel gas flow passage 48 flows along the anode 34 to induce a chemical reaction at the anode 34. The unreacted fuel gas is discharged from the fuel cell stack 10 through the fuel gas discharge passage 44b. In the membrane electrode assembly 30, the oxygen-containing gas supplied to the cathode 36, and the fuel gas supplied to the anode 34 are consumed in the chemical reactions at catalyst layers of the anode 34 and the cathode 36 for generating electricity.

The coolant supplied to the coolant supply port 26a is introduced into the coolant flow passage 52 on the surface 40b of the second separator 40. After absorbing the heat produced in generating electricity in the membrane electrode assembly 30, the coolant is discharged from the fuel cell stack 10 through the coolant discharge passage 46b.

Figure 4:
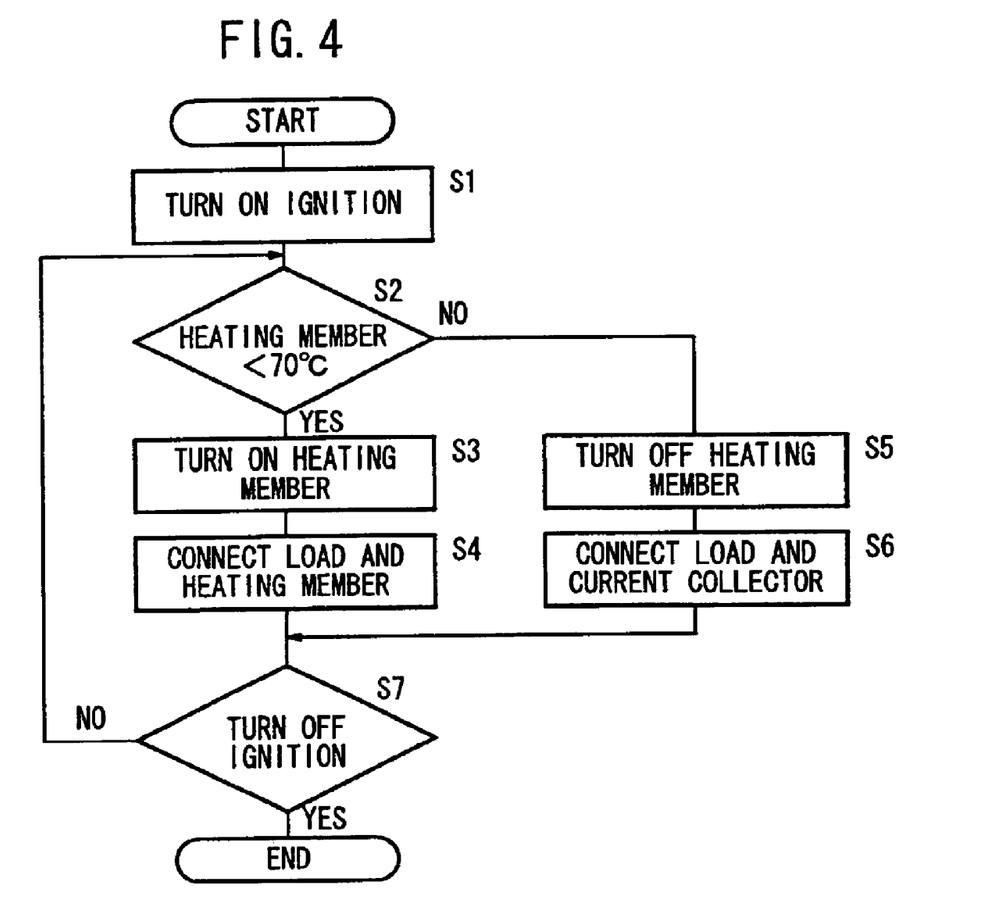
FIG. 4 is a flow chart showing a method of operating the fuel cell stack.

Next, a method of operation according to the present invention will be described with reference to a flow chart in FIG. 4.

When an ignition is turned on to start the operation of the fuel cell stack 10 (step S1), the temperature sensor 70 connected to the heating member 16a detects the temperature of the heating member 16a (step S2). If the temperature detected by the temperature sensor 70 is less than a predetermined temperature, for example, 70° C. (YES in step S2), control passes to step S3. In step S3, a control signal is outputted to the CPU 74 for turning on the heating members 16a, 16b.

Then, the CPU 74 performs a switching operation of the first switch 62, and the second switch 66 for connecting the power outputting terminals 56 of the heating members 16a, 16b to the load 68 in step S4 (see two-dot chain line in FIG. 2). In this manner, electricity is supplied from the fuel cell stack 10 to the load 68 through the heating members 16a, 16b. Since electricity from the fuel cell stack 10 is delivered to the load 68 through the heating members 16a, 16b, the heating members 16a, 16b are heated, and the end cells 12a, 12b adjacent to the heating members 16a, 16b are heated.

If the ignition is not turned off (NO in step S7), control goes back to step S2 for detecting the temperature of the heating member 16a. When the temperature of the heating member 16a is increased to 70° C. or more, and the fuel cell stack 10 is in a normal operating condition (No in step S2), control passes to steps S5, S6 for disconnecting the load 68 from the heating members 12a, 12b, and connecting the load 68 and the current collectors 14a, 14b for supplying electricity to the load 68 through the current collectors 14a, 14b.

The normal operating condition is a condition in which the temperature of the heating member 16a is 70° C. or more, for example. In the normal operating condition, the CPU 74 performs a switching operation of the first switch 62 and the second switch 66 to connect the power outputting terminals 54 of the current corrector 14a, 14b to the load 68 for supplying the electricity to the load 68 through the current collectors 14a, 14b.

As described above, in the first embodiment of the present invention, at the time of starting the operation of the fuel cell stack 10, if the temperature of the heating member 16a is relatively low, electricity is delivered through the heating members 16a, 16b. When the end cell 12a reaches a predetermined operating condition, the switching operation is performed to stop delivering electricity through the power outputting terminals 56 of the heating members 16a, 16b, and starts delivering electricity through the power outputting terminals 54 of the current collectors 14a, 14b. When electricity is delivered through the power outputting terminals 56 of the heating members 16a, 16b, heat is radiated from the heating members 16a, 16b to the end cells 12a, 12b. Therefore, water produced in the chemical reaction does not condense in the end cells 12a, 12b. Further, it is possible to prevent the power generating performance from being lowered due to the temperature drop in the end cells 12a, 12b.

In the first embodiment, the fuel cell stack 10 can operate efficiently even if the operation of the fuel cell stack 10 is started at a temperature below the freezing point. At the temperature below the freezing point, the difference between the temperature in the fuel cell stack 10 and the temperature of the external air is large. The temperature of the end cells 12a, 12b cooled by the external air is very low. If the end cells 12a, 12b are cooled to a temperature below the freezing point, water produced by the chemical reaction is frozen, and the oxygen-containing gas flow passage 50, the fuel gas flow passage 48 or the porous layers may be closed by the frozen water.

Since electricity is not delivered through the current collectors 14a, 14b, but delivered through the heating members 16a, 16b, the heating members 16a, 16b are heated. Therefore, it is possible to raise the temperature of the end cells 12a, 12b adjacent to the heating members 16a, 16b. Thus, the water in the end cells 12a, 12b is not frozen.

Further, in the first embodiment, when the end cell 12a reaches a predetermined operating condition, the switching operation is performed to stop delivering electricity through the heating members 12a, 12b, and start delivering electricity from through current collectors 16a, 16b. It is not necessary to constantly provide electricity for the heating members 16a, 16b having a low electric conductivity. Therefore, the power generating performance of the fuel cell stack 10 is greatly improved.

Further, in the first embodiment, when the fuel cell stack 10 is operated at a low output in the normal operating condition and the temperature of the fuel cell stack 10 is decreased, electricity is delivered through the heating members 16a, 16b. Therefore, the temperature of the end cells 12a, 12b are maintained, and it is possible effectively prevent the power generation of the fuel cell stack 10 from being lowered.

Figure 5:
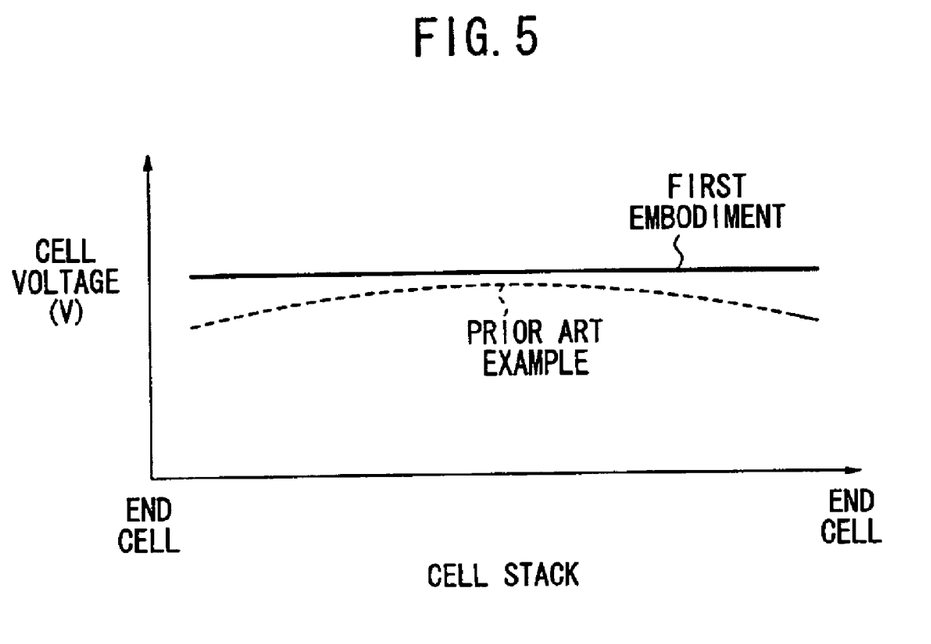
FIG. 5 is a graph showing a cell voltage according to the method of the present invention and a cell voltage according to the method in the prior art.

As described above, when the fuel cell stack 10 is operated in the normal operating condition, basically, the electricity is not delivered through the heating members 16a, 16b, but delivered through the current collectors 14a, 14b. When it is presumed that the temperature of the end cells 12a, 12b is lowered, the switching operation is performed to stop delivering electricity through the power outputting terminals 54 of the current collectors 14a, 14b, and start delivering through the power outputting terminals 56 of the heating members 16a, 16b. Thus, it is possible to effectively minimize the consumption of electricity, and perform the power generating operation efficiently in contrast to the case of the prior art in which electricity is constantly supplied to the heating members. The power generating performance of the end cells 12a, 12b is maintained, and the voltage of the fuel cells is uniform in the stacking direction of the fuel cell stack 10 as shown in FIG. 5. Therefore, it is possible to improve the overall power generating performance easily.

Figure 6:
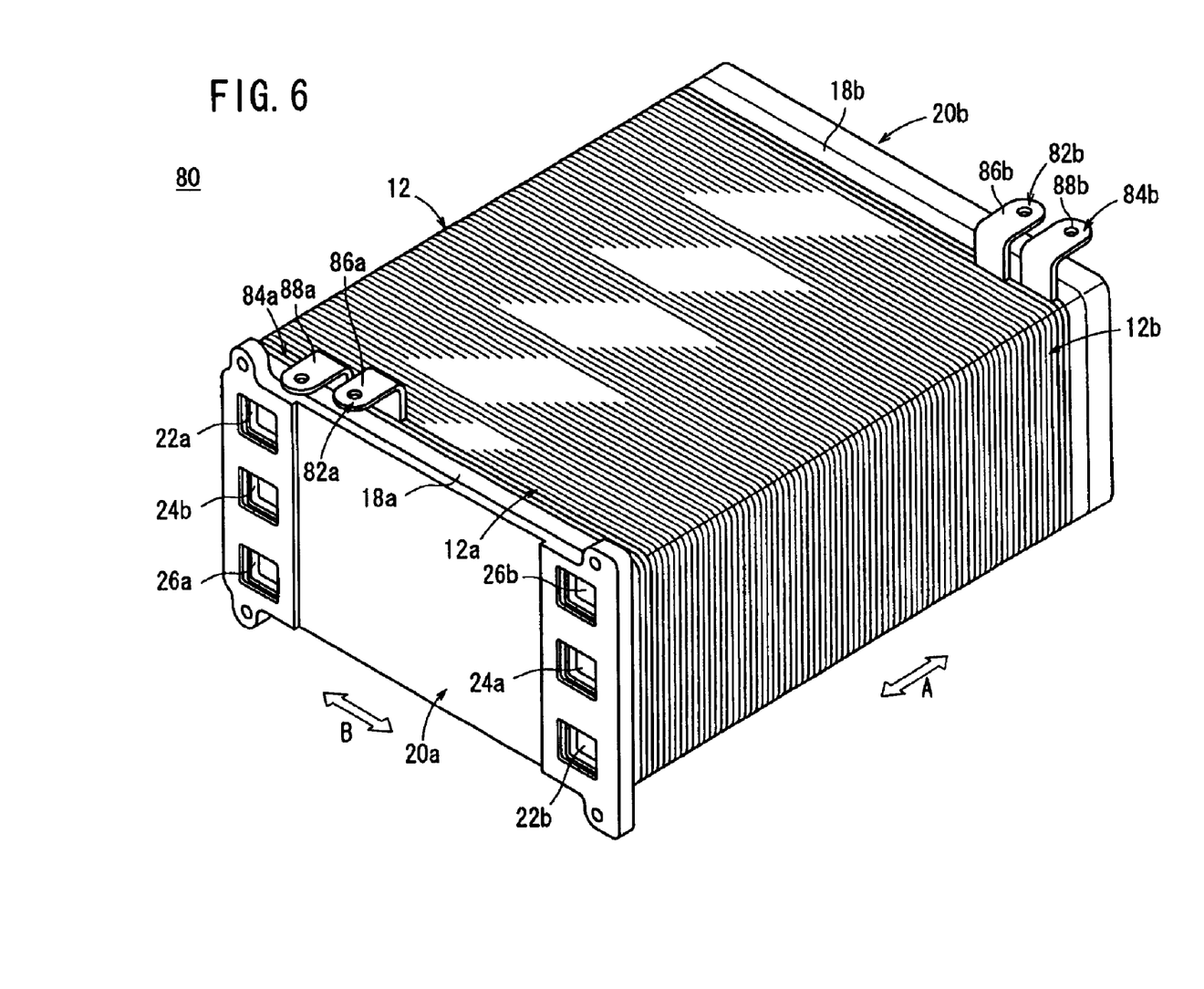
FIG. 6 is a schematic perspective view showing a fuel cell stack according to a second embodiment of the present invention.

FIG. 6 is a schematic perspective view showing a fuel cell stack 80 according to a second embodiment of the present invention. In the following explanation of the second embodiment and a third embodiment, the constituent elements that are identical to those of the fuel cell stack 10 explained in the first embodiment are labeled with the same reference numeral, and description thereof is omitted.

In the fuel cell stack 80, end cells (outermost fuel cells) 12a, 12b are disposed at opposite ends in the stacking direction of the fuel cells 12. A cathode current collector 82a and an anode current collector 82b are stacked on the end cells 12a, 12b. Heating members 86a, 86b are stacked on the outside of the cathode current collector 82a and the anode current collector 82b. Each of the current collectors 82a, 82b has a planar shape. The current collector 82a includes a power outputting terminal 86a having a bent portion, and the current collector 82b includes a power outputting terminal 86b having a bent portion. The power outputting terminal 86a extends from an upper portion of the current collector 82a, and the power outputting terminal 86b extends from an upper portion of the current collector 82b. Similarly, each of the heating members 84a, 84b has a planar shape. The heating member 84a includes a power outputting terminal 88a having a bent portion, and the heating member 84b includes a power outputting terminal 88b having a bent portion. The power outputting terminal 88a extends from an upper portion of the heating member 84a, and the power outputting terminal 88b extends from an upper portion of the heating member 84a. The power outputting terminals 86a, 86b of the current collectors 82a, 82b and the power outputting terminals 88a, 88b of the heating members 84a, 84b are positioned such that no interference occurs between these power outputting terminals.

In the second embodiment, each of the power outputting terminals 86a, 86b, 88a, 88b has a simple planar shape having a bent portion. With the simple structure, it is possible to minimize the heat radiation from the power outputting terminals 86a, 86b, 86c, 86d, and achieve the same effect as with the first embodiment.

Figure 7:
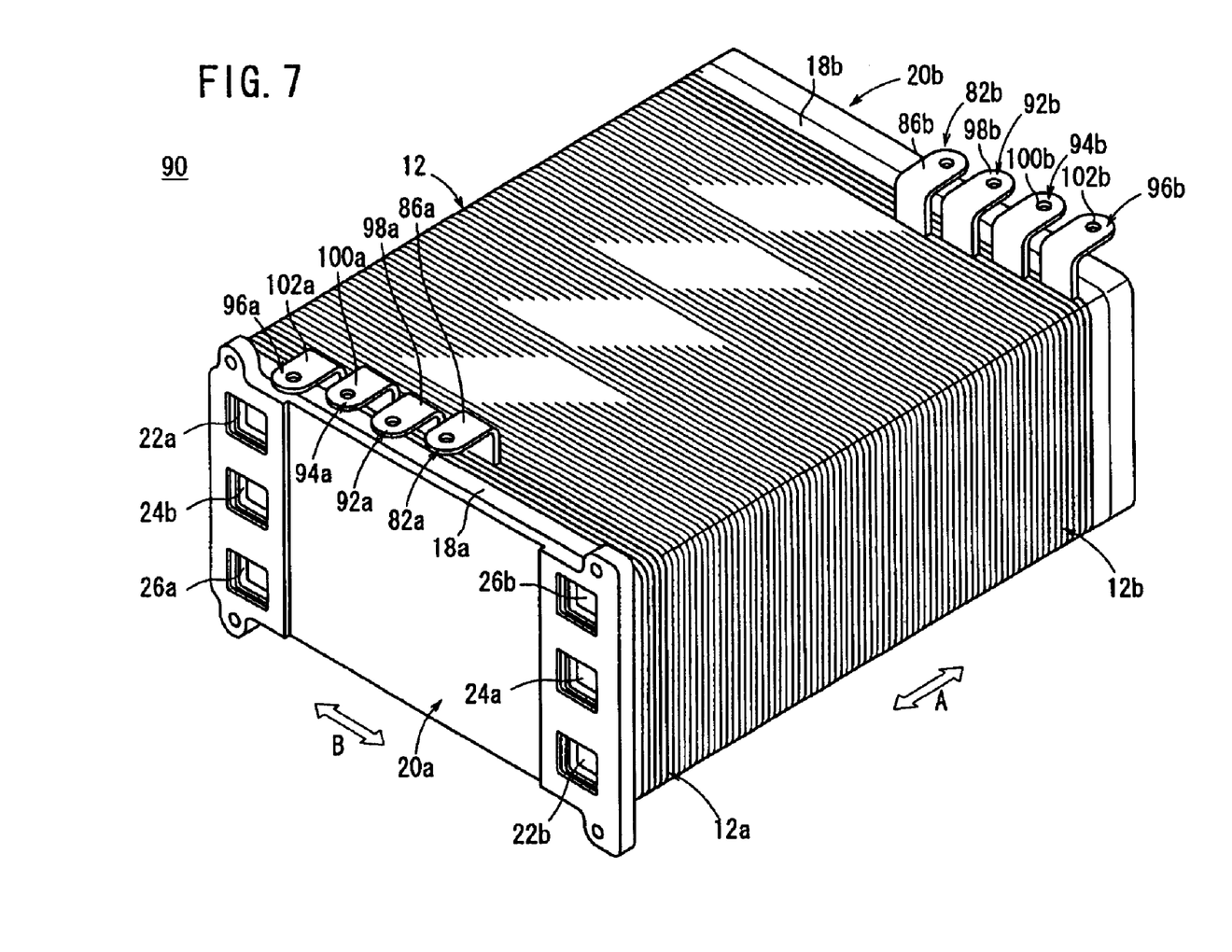
FIG. 7 is a schematic perspective view showing a fuel cell stack according to a third embodiment of the present invention.

FIG. 7 is a schematic view showing a fuel cell stack 90 according to a third embodiment of the present invention.

In the third embodiment, first heating members 92a, 92b, second heating members 94a, 94b, and third heating members 96a, 96b are stacked together on the outside of the current collectors 82a, 82b, respectively. The first heating members 92a, 92b, the second heating members 94a, 94b, and the third heating members 96a, 96b include power outputting terminals 98a, 98b, 100a, 100b, 102a, 102b, respectively. Each of the power outputting terminals 98a, 98b, 100a, 100b, 102a, 102b has a planar shape and a bent portion.

Figure 8:
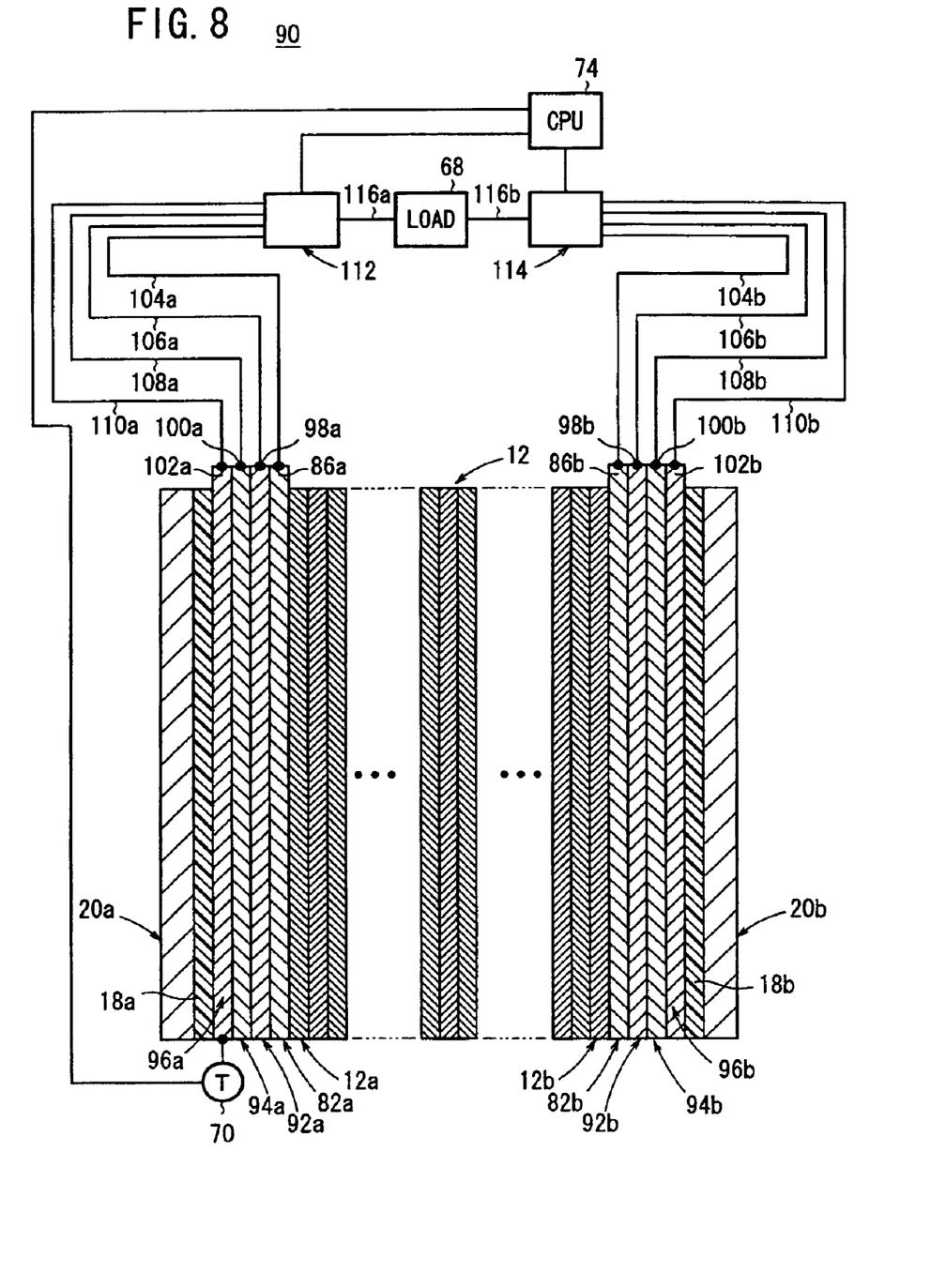
FIG. 8 is a diagram showing a circuit for delivering electricity from fuel cell stack according to the third embodiment of the present invention.

As shown in FIG. 8, the power outputting terminal 86a, 86b, 98a, 98b, 100a, 100b, 102a, 102b are connected to first and second switches 112, 114 through lead wires 104a, 104b, 106a, 106b, 108a, 108b, 110a, 110b, respectively. A load 68 is connected to power outputting lines 116a, 116b.

The first and second switches 112, 114 have four switching positions, i.e., a first position for connecting the power outputting lines 116a, 116b to the current collectors 82a, 82b, a second position for connecting the power outputting lines 116a, 116b to a pair of heating members, a third position for connecting the power outputting lines 116a, 116b to two pairs of the heating members, and a fourth position for connecting the power outputting lines 116a, 116b to three pairs of the heating members.

As described above, in the third embodiment, electricity is delivered to the load 68 through the current collector 82a, 82b in the normal operating condition. When the temperature of the end cells 12a, 12b are lowered, or when the temperature of the external air is below the freezing point, for example, depending on the temperature, electricity is delivered to the load 68 through the first heating members 92a, 92b, through the first and second heating members 92a, 92b, 94a, 94b, or through all of the first through third heating members 92a, 92b, 94a, 94b, 96a, 96b.

Therefore, even if the operating condition changes depending on the temperature, the power generating performance of the end cells 12a, 12b is recovered swiftly. Thus, the power generation in the overall fuel cell stack 90 can be effectively performed.

In the first through third embodiments, the fuel cell stacks 10, 80, 90 use the solid polymer ion exchange membrane 32. However, the present invention is applicable suitably to other fuel cell stacks using various types of electrolytes.

In the first through third embodiments, the heating members 16a, 16b, 84a, 84b, and the first through third heating members 92a, 92b, 94a, 94b, 96a, 96b are provided at opposite ends of the fuel cells 12 in the stacking direction. However, the heating member may be provided at one end of the fuel cells 12 in the stacking direction.

In the fuel cell stack and the method of operating the fuel cell stack according to the present invention, the heating member having the power outputting terminal is stacked on the outside of at least one of the anode current collector and the cathode current collector provided at opposite ends of the fuel cells in the stacking direction. When the temperature of the fuel cells provided at the ends in the stacking direction is lowered, electricity is delivered through the heating member. Therefore, the heating member is heated.

With the simple structure and operating process, it is possible to effectively prevent the temperature of the fuel cells from being lowered, and it is possible to efficiently improve the power generating performance of the fuel cells. Further, when the fuel cell stack is the normal operating condition, electricity is not delivered through the heating member. Therefore, electricity is not wastefully consumed by the heating member, and thus, the power generation can be performed efficiently.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell stack comprising a plurality of fuel cells stacked together, said fuel cells each including a pair of separators, and an electrolyte electrode assembly interposed between said separators, said electrolyte electrode assembly including an anode, a cathode, and an electrolyte interposed between said anode and said cathode, said fuel cell stack further comprising:

current collectors stacked on outermost fuel cells at opposite ends in a stacking direction of said fuel cells;

a heating member stacked on the outside of at least one of said current collectors, said heating member having a first power outputting terminal for conducting electricity generated by said fuel cell stack to a load; and a switch connected to a second power outputting terminal of one of said current collectors, and said first power outputting terminal of said heating member.

2. A fuel cell stack according to claim 1, further comprising:

a temperature sensor connected to said heating member; and a control unit for controlling said switch based on a detection signal outputted from said temperature sensor.

3. A fuel cell stack according to claim 2, wherein said first power outputting terminal of said heating member has a cylindrical shape, and extends in said stacking direction; and said second power outputting terminal of one of said current collectors has a rod shape, and extends through said first outputting terminal of said beating member such that an end of said second power outputting terminal of one of said current collectors is exposed to the outside.

4. A fuel cell stack according to claim 2, wherein said first power outputting terminal of said heating member has a planar shape and a bent portion, and is formed at an end of said heating member, and wherein said power outputting terminal of said current collector has a planar shape and a bent portion, and is formed at an end of said current collector.

5. A fuel cell stack according to claim 2, wherein a plurality of heating members are stacked on at least one of said current collectors; and electricity from said fuel cell stack is delivered through an arbitrary number of said plurality of heating members selected by said switch.

* * * * *